United States Patent
Crook (10) Patent No.: US 7,102,663 B2
(45) Date of Patent: Sep. 5, 2006

(54) MIXED-MEDIA TELECOMMUNICATION CALL SET-UP

(75) Inventor: Michael David Stanmore Crook, Monmouthshire (GB)

(73) Assignee: Orange Personal Communications Services Ltd., Bristol (GB)

(*) Notice: Subject to any disclaimer, the term of this patent is extended or adjusted under 35 U.S.C. 154(b) by 197 days.

(21) Appl. No.: 10/428,166

(22) Filed: Apr. 30, 2003

(65) Prior Publication Data
US 2004/0218035 A1    Nov. 4, 2004

(30) Foreign Application Priority Data
Nov. 1, 2000   (GB)  ................... 0026700.5

(51) Int. Cl.
*H04N 7/14*    (2006.01)
(52) U.S. Cl. ............... 348/14.01; 348/14.02; 348/14.03
(58) Field of Classification Search .. 348/14.01–14.09, 348/14.1, 14.11, 14.12, 14.13; 379/93.17; 370/260, 261; 455/426.1, 556.1, 556.2
See application file for complete search history.

(56) References Cited

U.S. PATENT DOCUMENTS

| | | | |
|---|---|---|---|
| 5,371,534 A | 12/1994 | Dagdeviren et al. | |
| 5,543,939 A | 8/1996 | Harvey et al. | |
| 5,717,857 A * | 2/1998 | Burkman et al. | 709/204 |
| H1714 H * | 3/1998 | Partridge, III | 348/14.01 |
| 5,751,722 A * | 5/1998 | Maekawa | 370/522 |
| 5,999,207 A * | 12/1999 | Rodriguez et al. | 348/14.03 |
| 6,281,925 B1 | 8/2001 | Kosaka | |
| 6,483,531 B1 * | 11/2002 | Ryu | 348/14.01 |

FOREIGN PATENT DOCUMENTS

| | | |
|---|---|---|
| EP | 0 447 212 A1 | 9/1991 |
| EP | 0 583 094 A2 | 2/1994 |
| EP | 0 818 926 A2 | 1/1998 |
| EP | 0 930 768 A1 | 7/1999 |
| GB | 2 315 388 A | 1/1998 |
| GB | 2 332 825 A | 6/1999 |
| JP | 08289274 | 11/1996 |
| JP | 09149186 A * | 6/1997 |
| WO | WO 01/76288 A1 | 10/2001 |

OTHER PUBLICATIONS

Lindbergh, Dave. *"The H.324 Multimedia Communication Standard."* IEEE Communications Magazine, pp. 46-51 (Dec. 1996).

* cited by examiner

*Primary Examiner*—Melur Ramakrishnaiah
(74) *Attorney, Agent, or Firm*—Knobbe Martens Olson & Bear LLP (57) ABSTRACT

A method of transferring communication between communication channels of differing bandwidth comprises establishing data communications on a first channel having a first bandwidth, establishing data communications on a second channel in response to a trigger indicating changes in the data to be communicated, wherein the second channel has a bandwidth providing resources different from the first bandwidth of the first channel. The method further comprises releasing communications on the first channel in response to set up of data communications on the second channel.

31 Claims, 8 Drawing Sheets

MIXED-MEDIA TELECOMMUNICATION CALL SET-UP

CROSS REFERENCE TO RELATED APPLICATION

This application claims priority under 35 U.S.C. § 120 to PCT International Application Number PCT/GB01/04603, filed on Oct. 16, 2001 and published in the English language, which claims priority under 35 U.S.C. § 119 to United Kingdom Patent Application Number 0026700.5 filed on Nov. 1, 2000. The disclosure of the above-described filed applications are hereby incorporated by reference in their entirety.

FIELD OF THE INVENTION

The present invention relates to call set-up techniques, hardware and software interfaces and methods of operating same, for the transmission of mixed-media data across telecommunications networks. More particularly, although not exclusively, the present invention relates to techniques for setting up calls consisting of voice and video data, across telecommunications networks, and a hardware and software interface and method of operating same.

BACKGROUND TO THE INVENTION

Devices such as videophones, video conferencing systems and mixed media data transmission/communication systems are known in the art. Depending on the particular application and the quality of service that is needed, the combined transmission of mixed media, for example, voice and video, can require bandwidth at the limit of or exceeding that which is currently available.

Solutions to this problem have generally focused on hardware-based solutions. The reader is referred to U.S. Pat. No. 5,543,939 (to Harvey et al) and U.S. Pat. No. 5,371,534 (to Dagdeviren et al) in this regard.

A problem with hardware-based approaches is that the existing telecommunication infrastructure often needs to be physically supplemented or modified, for example by augmenting or replacing existing copper landline with fibre optics.

Although such solutions may be physically practical, they may be economically prohibitive.

It is therefore desirable to implement a mixed media, particularly audio/video, data transmission solution which does not require significant modification of the communications infrastructure itself.

Audio-visual communication introduces issues of privacy and presentation as well as the ability to communicate visual cues. To gain widespread acceptance, videophone services will need to address these issues by incorporating controls and procedures particular adapted for dealing with video/audio communication.

It is accordingly one object of the invention to provide a method and apparatus for setting up and handling mixed-media calls which allows the transmission of mixed media data, preferably using substantially existing network infrastructures, that is relatively straightforward to implement. It is a further object of the invention to provide a videophone interface and a method of operating same which addresses at least some of the human factors issues relevant to-combined video and audio communication.

For the purposes of describing the following preferred embodiments of the invention, the following description will be given in the context of the Groupe Spécial Mobile (GSM) model. However, this is not to be construed as a limiting application. Other networks may be amenable to operation in accordance with the invention.

SUMMARY OF CERTAIN INVENTIVE EMBODIMENTS

According to the present invention there is provided a method of setting up a mixed media telecommunications call between mobile stations capable of video telephony, the method comprising the following steps:

requesting user selection, via a user interface of a first mobile station, of a type of video image to be displayed on a display of a second mobile station during at least a part of a telecommunications call between the first mobile station and a second mobile station, the selection being between at least the following: live video, to be captured by a camera of the first mobile station and transmitted to the second mobile station, and pre-stored static or dynamic video;

in response to the request, receiving user input, via a user interface of the first mobile station, the user input indicating a selected type of video image;

on the basis of the user input, setting up a mixed media telecommunications call between the first mobile station and the second mobile station such that the selected type of video image is displayed on the display of the second mobile station during at least a part of the telecommunications call.

BRIEF DESCRIPTION OF THE DRAWINGS

Features and advantages of various embodiments of the invention will become apparent from the following description, given by way of example only, of preferred embodiments of the invention, which refers to the accompanying drawings wherein.

DETAILED DESCRIPTION OF CERTAIN INVENTIVE EMBODIMENTS

Figure 3:
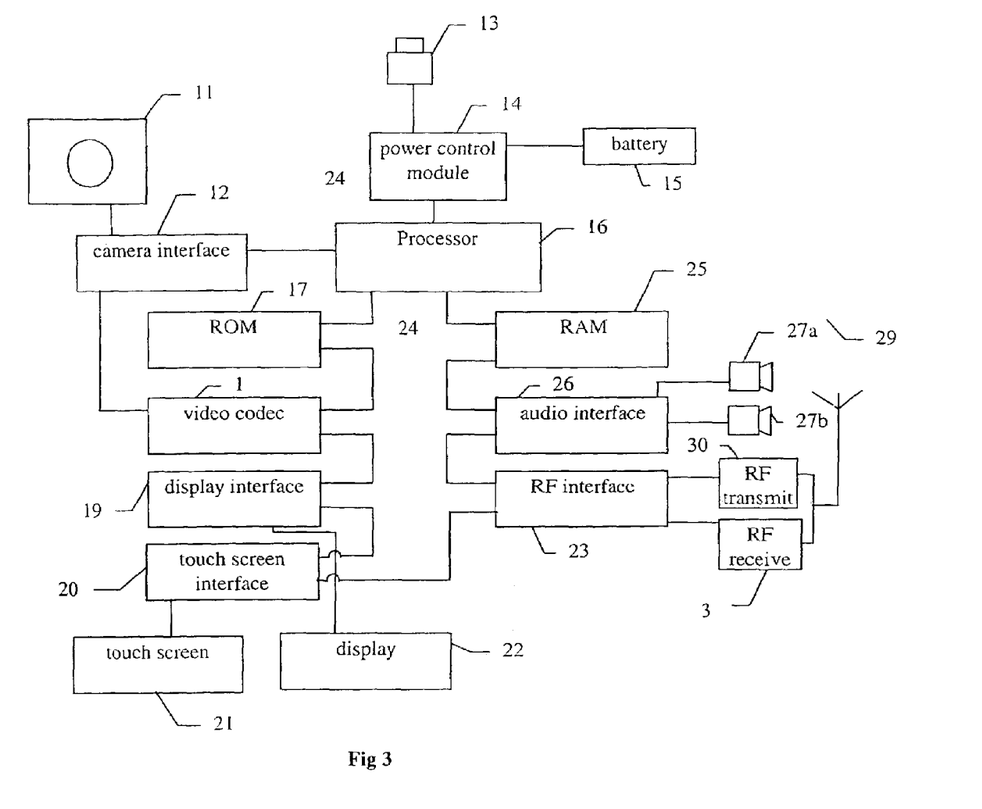
FIG. 3 illustrates a simplified block diagram of the functional elements of mobile station suitable for use with the invention.

FIG. 3 shows a schematic block diagram of the main functional elements which are common to the various embodiments of a videophone device suitable for use with the present invention. The individual functional elements are each individually known and will not be described in detail. A main processor 16 may be a conventional programmable microprocessor, examples of which are well known in the art, or a special purpose or specially configured unit such as a digital signal processor. A read only memory (ROM) 17 is connected to the processor 16 and is used to store control programs, data and images. The ROM 17 may be implemented by any appropriate technology, for example, using a flash PROM. A random access memory (RAM) 25 is connected to the processor 16 via bus 24. This is used as working storage and for the storage of data and images captured using the (CCD) video camera 11.

Signals corresponding to the data captured by the camera are passed via a camera interface 12 to the processor 16. The camera interface 12 also provides the video codec 18 with a digital representation of the captured data from the camera 11. This can be suitably processed for display and/or transmission to the mobile communications system. An indicator light (not shown) may be connected to the processor 16 to report successful capture of data and/or images from the camera 11 and may also be used during video conferencing to indicate that the device is operating correctly.

The camera interface 12 carries out all of the necessary signal conditioning on receiving images from the camera 11. Signal conditioning will depend on the precise configuration of the camera but will preferably include signal conditioning to enable accurate analog to digital conversion with sufficient buffering of the captured data. The camera 11 will include all the necessary support circuitry to produce a fully functional camera delivering an appropriately formatted video signal.

The camera 11 may be fixed in a predetermined orientation on the mobile communications device (not shown). Alternatively, the camera 11 may be provided with a suitable mechanism to allow adjustment of the orientation of the camera in order to enable the user to point the camera in various directions. This function may also be power assisted if desired.

An on/off button 13 is connected via a suitable interface to a power control module 14. The power control module 14 responds to the operation of this button in a powered down state to connect a battery 15 to the processor 16. The power control module 14 may also control the charging of the battery 15. The power control module 14 will also control the power requirements when a standard AC/DC power supply is connected to the videophone.

A display interface 19 connects the display 22 via the bus 24 to the processor 16. The display interface 19 responds to instructions from the processor 16 to drive the built in display 22 in a conventional manner.

The display 22 is provided with a touch sensitive screen 21. A touch screen interface 20 couples the touch sensitive display to the processor 16 via the bus 24. The touch screen 21 is a mechanism which is independent of the video display 22. For example, a transparent touch screen membrane may be placed over the display 22 and connected and calibrated appropriately.

The processor 16 can be arranged to transmit to the display 22 a menu of user selectable items, such as icons, buttons, text etc. and is responsive to the location at which the screen is touched in order to input the user selection of a particular menu item. The touch sensitive screen can then thus be used as a dynamic and reconfigurable user interface, the function of which will be described in more detail below. Touch screen entry can be used in place of or in addition to command entry via an external keyboard or voice command (if the mobile station is equipped with appropriate hardware and software). Additionally, the touch screen area or part thereof, can be configured as a general purpose scribing area to allow entry of data and written commands.

An audio interface 26 connects the audio receiver means, consisting of one or more microphones 27a and audio transmitter means such as one or more earpieces and/or speakers 27b to the processor 16 and carries out all of the necessary signal conditioning as required to output and to receive audio signals.

A radio frequency (RF) interface 23 is also connected via the bus 24 to convert any data to be transmitted into signals for driving an RF transmitter 30, and converts signals from an RF receiver 31 into data to be passed via the bus to the relevant interfaces. The RF transmitter 30 and RF receiver 31 are connected to a radio antenna 29. This RF interface 23 consequently enables wireless communications between the videophone and the mobile communications system.

The processor 16 is programmed by means of control programs and data stored in the ROM 17 and in use, the RAM 25, to receive signals from the camera 11 via the camera interface 12, to interpret those signals and to derive data therefrom which is displayed on display 22 and which can be stored in the RAM 25 or any other suitable memory device.

An example of a videophone display operating according to the invention is shown in FIGS. 5 to 11. Various display configurations are shown which correspond to different communication states of a senders videophone device.

To set up and handle a multimedia call, the invention provides the following procedure, which is given by way of example. The basic service provided by virtually all telecommunications networks, including GSM, is speech transmission (telephony). GSM also provides other services including data communication at various rates, including a voice call rate of up to 9600 bps and a High Speed Circuit Switched Data (HSCSD) connection rate of up to 56,000 bps. Data can be sent to ISDN, Packet Switched Public Data Networks, and Circuit Switched Public Data Networks using a range of access techniques and communications protocols. Other data services include Group 3 facsimile and the Short Message Service (SMS).

Supplementary services augment those listed above. These include (under the current Phase I specifications) different types of call forwarding, call hold and call barring for incoming or outgoing calls. Phase 2 specifications include supplementary services such as call-waiting and multi-party conversations.

A GSM network comprises a number of functional entities. The operation of these is known to the skilled person and for brevity will be referred to only in general terms below. For a more detailed discussion, the reader is referred to "*The GSM System for Mobile Communications*", Mouly & Pautet, Cel & Sys, 1992, and the GSM technical specifications published by the European Telecommunications Standards Institute (ETSI).

In addition to the components discussed with reference to FIG. 3, a videophone mobile communications device or mobile station (MS) includes a mobile terminal which contains a Subscriber Identity Module (SIM). The SIM (card) provides a way of uniquely identifying a user that is not restricted or tied to a particular GSM mobile terminal. The mobile equipment is identified by an International Mobile Equipment Identity (IMEI) number. The SIM incorporates an International Mobile Subscriber Identity (IMSI) number.

The mobile station communicates with a Mobile Switching Centre (MSC) via a Base Station Subsystem (BSS). The MSC behaves like a standard switching node of an PSTN or ISDN network and provides mobile subscriber functionality including registration, authentication, location updating, handovers and call routing. The MSC is the link between the mobile station (via the BSS) and the hard-wired networks. The Home Location Register (HLR) and Services Location Register (SLR) provide call routing and roaming functionality. The HLR handles the administrative information relating to each subscriber along with the current physical location of the mobile station.

The GSM radio link level uses a combination of Time Division Multiple Access (TDMA) and Frequency Division Multiple Access (FDMA). The frequency spectrum portion allocated to GSM corresponds to 25 Mhz portions of the spectrum divided into 124 carrier frequencies spaced 200 kHz apart.

One or more carrier frequencies are assigned to each base station and each of the carrier frequencies is divided in time using TDMA. The data transmission units are called burst periods, with 8 burst periods being grouped into a TDMA frame. This frame forms the basic unit for the definition of logical GSM channels.

There are two types of channels: dedicated channels and common channels. Dedicated channels (such as the traffic channel: TCH) are allocated to a particular mobile station. Common channels are used by mobile stations in idle mode.

A traffic channel (TCH) is used to transmit speech and data information. These channels are defined using a 26-frame multiframe (i.e; a group of 26 TDMA frames). Out of the 26 frames, 24 are used for traffic, 1 is used for what is known as the Slow Associated Control Channel (SACCH) and 1 is unused. Traffic channels for the uplink and downlink are separated by three burst periods.

Signalling data can be transported in parallel with transmission of user data. The SACCH channel can carry approximately 2 messages per second in each direction and exhibits a transmission delay of about 0.5 sec. This channel is used to communicate non-urgent overhead information which is generally related to reception performance data used to perform handover decisions.

The other overhead data is transmitted by means of the TCH itself. These data include messages relating call establishment progress, authentication information or signalling to initiate a handover. This is termed Fast Associated Signalling (FACCH). The mobile station and base station receiver is able to distinguish between these data both being transmitted on the TCH by means of a 'stealing flag'. The transmission of FACCH data during traffic transmission causes the loss of user data (at known locations in the data stream) which mirror losses usually experienced as transmission errors.

Common channels are used to exchange signalling information. Signalling information is used to signify to the mobile station that it is to switch into dedicated (i.e.; data communication) mode or to signal other administrative procedures.

The types of traffic with which the invention is mainly concerned are voice (audio) and video data. As with all other communications using GSM, audio signals are digitally encoded and transmitted via the GSM network as a stream of digital data.

For speech encoding, GSM uses a Regular Pulse Excited-Linear Predictive Encoder (RPE-LPE) approach to digitise the speech prior to transmission. This technique relies on latency information from previous samples to predict the current sample. Coefficients of the linear combination of the previous samples, plus an encoded form of the residual, the difference between the predicted and actual sample, are used to represent the signal.

The raw speech input is divided into 20 ms samples, each of which is encoded as 260 bits. The encoded digitised speech data is error hardened using convolutional encoding and block interleaving. The speech codec produces a 260 bit block for every 20 ms of speech sample. As the frequency response of the human ear is variable across the spectrum, not all of the encoded speech data is of equal significance in terms of speech reproduction and comprehension by the human auditory system. Therefore, some bits of this block are more important than others in terms of perceived speech quality and comprehension. Accordingly, the bits are divided into three classes reflecting their importance to and effect on the resulting perceived audio quality and comprehension. Each class is processed according to different error correction codes. This procedure is discussed in more detail in the reference given above and elsewhere in the literature.

Each sample is interleaved to reduce the effect of burst errors. The digital signal is then modulated onto the analogue carrier using Gaussian-filtered Minimum Shift Keying (GMSK).

The above method of digitally encoding the speech data may be specific to voice or audio information. The algorithms used for channel coding and modulation may be different for data and for different data rates.

For video digitisation and encoding, the following procedure is preferably used. For a detailed description, the reader is referred to UK patent No. GB 2 306 840 B (University of Strathclyde) the disclosure of which is incorporated herein by reference.

The video data compression transform (SCT) technique implements a video codec particularly suited for use on an ultra-low bitrate channel. The SCT implements a representation of video sequences by the co-ordinated application of vector quantisation (VQ), motion compensation (MC) and (optionally) residual encoding (RE).

Briefly, the method is as follows: a codebook is created by extracting reference patches from one or more library image frames. These library image frames preferably contain features which are likely to be contained in the image frame to be compressed. Groups of pixels (32×32, 16×16 and 8×8) are known as pixel patches. An image frame to be compressed is sub-divided into an array of contiguous data blocks or image patches at a first level. The image is then subdivided a further two times, at different levels to provide a set of pixel patches of different size. The subdivision is such that the patches overlap at their edges. Each image patch is assigned a position vector which may suitably be the centre of the patch.

All patches are normalised for brightness and contrast. For each normalised image patch, correspondingly sized entries in the codebook are searched to identify the one that most closely resembles the image patch. The codebook index of each of the matched reference patches is stored together with the position vector and the brightness/contrast normalisation factors for the matched image patch, as a compressed encoding. Some error handling is performed and the reader is referred to UK patent Number GB 2 306 840 B for further details. The compression technique involves the provision of some arbitrary reference image frame which can be taken as a first (poor) approximation to the image frame to be compressed. An error calculation is performed by comparing the errors between the reference frame and the frame to be compressed. This set of errors is then compared with the set of errors obtained for the reference patches.

From this comparison, the codebook reference patch leading to the greatest reduction in error is identified. The corresponding compressed encoding is stored in the a compressed image representation. Also, the reference image is updated by adding the selected reference patch thereto.

This process is repeated recursively so that the reference patches are continually added to the reference image frame leading to a stepwise improvement in the quality of the reference frame. In parallel, the compressed encodings are added to the compressed representation. Recursion is maintained until the quality of the reference frame reaches some predetermined threshold. In the context of combined audio/video transmission, the first frame captured by the transmitting videophone is compressed as described above using some initial arbitrary reference image which is stored in memory. A set of compressed encodings is obtained as outlined above and stored in buffer memory. This data is then transmitted to the buffer memory of the receiving videophone where it is decoded and added to the reference image for display. The data is also added to the reference image stored in the transmitting videophone memory.

While the transmitting mobile station (hereafter referred to as a videophone) is compressing the first captured image frame, its camera captures a second image frame. Following transmission of the first set of patch data, the compression process is repeated but this time looks for patches which will give the best improvement in the 'new' reference image relative to the second captured image frame. The compressed encodings of these patches are again stored in buffer memory prior to transmission to the receiving videophone. The process is repeated for each newly captured frame such that the reference image frame continually tracks changes in the captured image frames.

The preferred embodiment of the present invention utilises a variant of the known H323, H324 and H340 bitstream controlled protocols for multimedia data transmission. The variant operates essentially in accordance with the standards noted above. Communications under, for example, the H323 standard corresponds to a mix of audio, video, data and control signals. Thus the protocol is capable of asymmetric operations in respect of different encoding and decoding algorithms for different media. The standards referred to above include call control functions related to signalling, call set-up, capability exchange and signalling of commands and indications, and messages to open and describe the content of logical channels. A control layers formats the data streams into messages which are output to the network interface.

Figure 1:
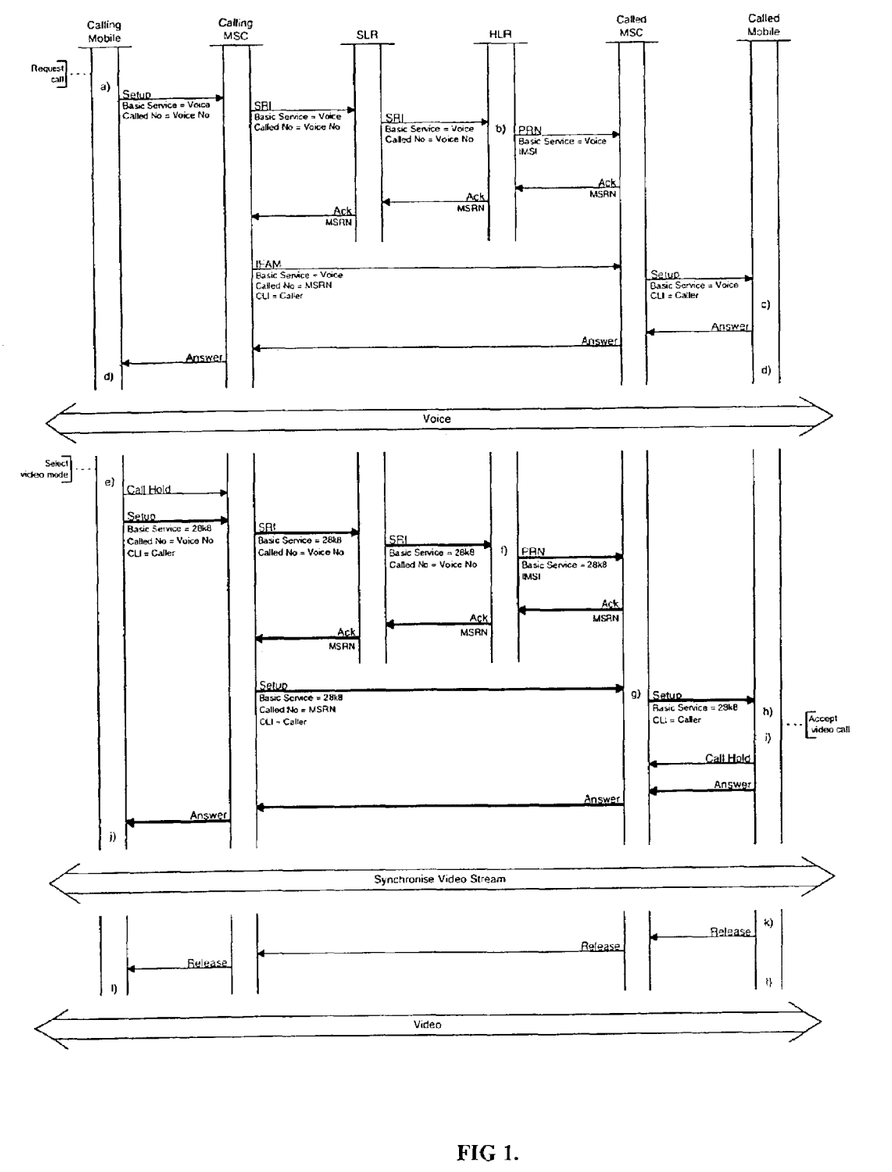
FIG. 1 illustrates the call set-up procedure in accordance with one embodiment of the present invention.

Referring to FIG. 1, an example of the flow control processes according to a particular multimedia communication consent process of the invention is shown. The techniques described herein allows for both the notification or negotiation and set-up of a combined voice/video call by using the supplementary service corresponding to Call Hold.

In FIG. 1, voice calls correspond to single lines and video/audio (data) calls double lines. Referring to FIG. 1, a caller initiates a standard voice call (steps a) to d) in FIG. 1). Once established either subscriber can elect to switch to video mode. This will trigger the consent process as described below. At step e) the caller switches to video mode, which uses a HSCSD connection. This is done by the callers videophone putting the call on hold and initiating a second (HSCSD) call to the same number. Network call handling, using the Call Waiting supplementary service, ensures that the call arrives as a waiting call at the right destination and identified as a data call (steps f) and g)). The recipients videophone presents the subscriber with the option to either switch to video mode or remain in voice mode h). If the recipient chooses to consent to video mode i), the recipients videophone places the voice call on hold and answers the data call. The callers and recipients videophones then synchronise the data stream as a video call, release the voice call and enable video locally.

At this point, static or dynamic pre-recorded video or alternatively live video may be transmitted. The specific video mode will depend on the response of the caller/recipient during the video call negotiation process.

Figure 2:
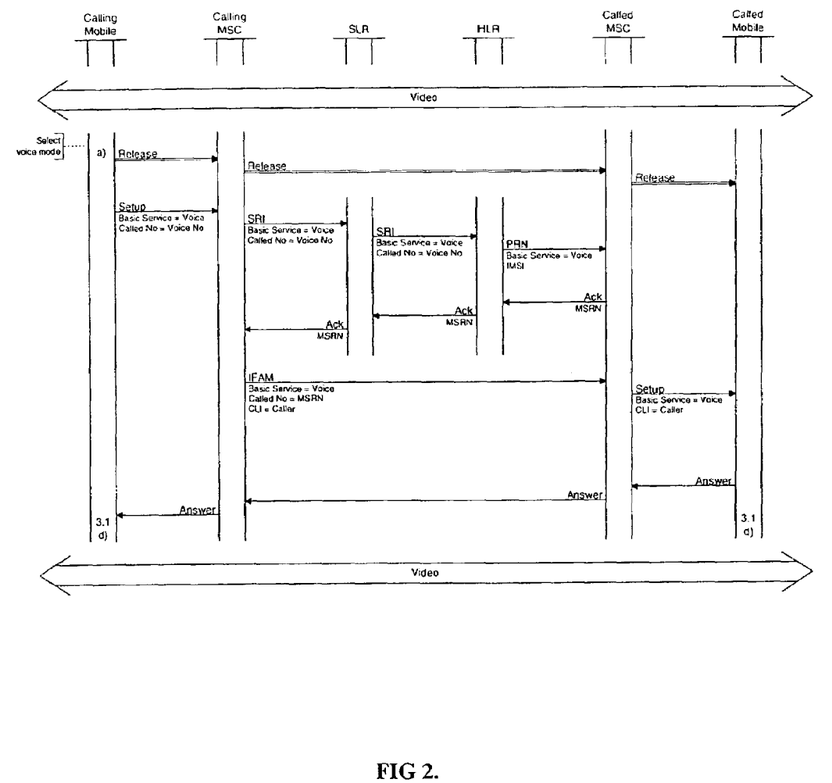
FIG. 2 illustrates call flow for switching from video to voice mode.

FIG. 2 illustrates a call flow path for switching from video to voice mode. The two calls are identified in the same way as above, by the use of single lines for the voice call and double lines for the video call. For calls initiated by the called subscriber, the sequence may be reversed.

If the caller selects voice mode, the calling videophone releases the video call and makes a new (voice) call to the same number as the original call. This will incur a delay as the radio connection must be released and re-established. If the user who selects voice mode did not initiate the call, the videophone shall also inform that user that he to be charged for the ongoing call, giving the option to cancel the request before carrying out these actions. The method described above may be modified slightly, depending on the type of network which is being used. However, such variations are considered to fall within the scope of the invention.

In conjunction with the multimedia call handling method described above, an important aspect of the present invention relates to user interaction during the video/audio communication process. Audio communications relies on a relatively limited subset of verbal communication attributes including aspects such as tone, inflexion and content. Enhancing telecommunication services to include video introduces complex issues of user interaction and human factors. For this reason, a key issue in relation to the combined voice and video call handling procedures described above is that of user control. This is important in terms of initiating/negotiating combined video and audio calls as well as the ongoing handling of a videophone call.

It should be mentioned that the methods illustrated in FIGS. 1 and 2 may each be implemented for transferring both from voice to video and from video to voice; as such, the methods are to be understood as alternative embodiments. In networks where it is not possible to put data calls on hold, it is preferred that the method of FIG. 2 is used to transfer from video to voice.

Figure 4:
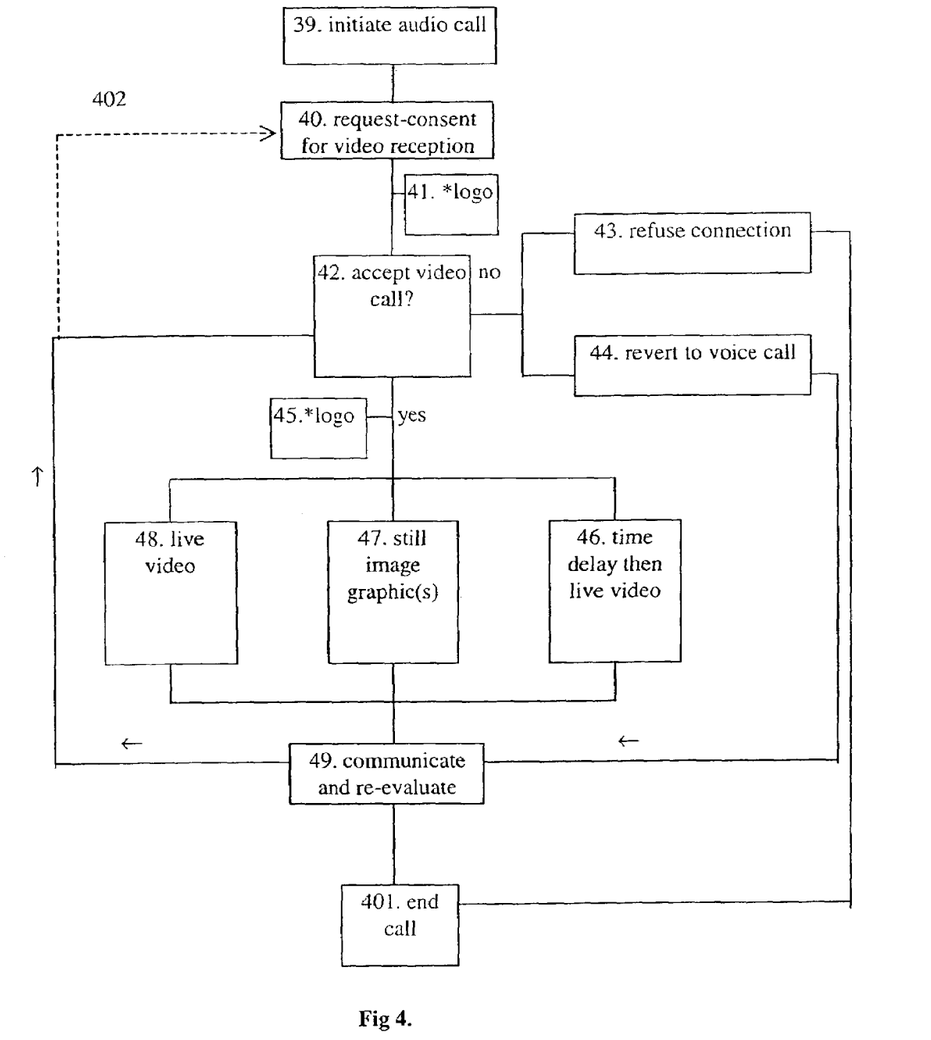
FIG. 4 illustrates a flow diagram of a negotiation protocol for establishing videophone calls.

FIG. 4 shows a simplified flow diagram illustrating a combined video and audio call negotiation protocol or method of operating a videophone interface. The scenario illustrated and described is that of a caller wishing to make a video/audio call to a recipient. In the following description, the videophone software referred to is part of the Microsoft® Windows® CE operating system, otherwise known as Rapier. The use of this interface is not considered to be limiting as the method may be implemented on different platforms using a variety of alternative operating systems. Screen displays are also given by way of example only.

At present, a video call can only be made when a single outgoing audio call is in progress. If a conference call in is progress or a call is on hold, the video option will not be available. This limitation may depend on the type of network and the associated channel handling procedures.

Figure 5:
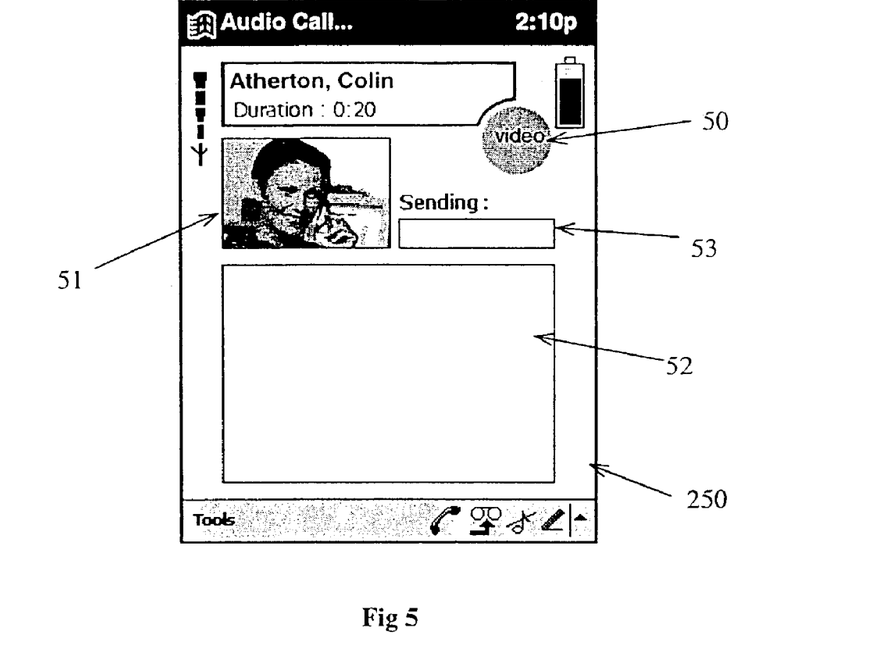
FIG. 5 illustrates a callers videophone display during an audio call and prior to the establishment of a videophone call.

FIGS. 5 to 11 show videophone screen displays at various stages of a combined video and audio call. Referring to FIG. 5, once the desired called party or recipient is chosen, most of the command entry is performed by means of a softkey 50. The function of this key is context sensitive.

Referring to FIG. 4, a caller activates a dialling routine 39 at his or her videophone. This establishes an audio call between the caller and recipient as for a standard voice call. From the callers point of view, at this time, the status display 251 (see FIG. 5) shows a call timer and the screen is captioned "Audio Call . . . ".

Figure 6:
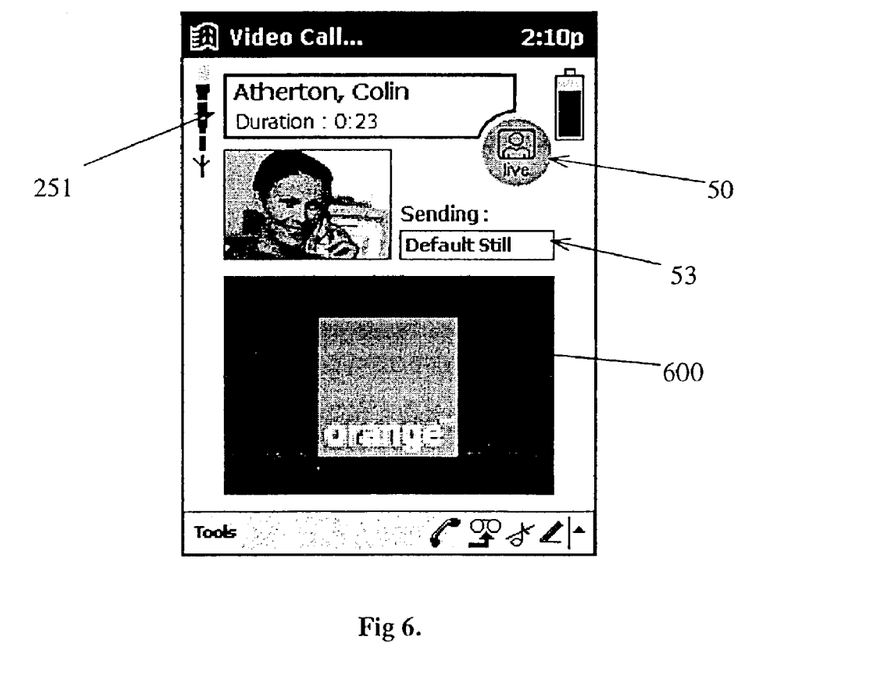
FIG. 6 illustrates a callers videophone display during the video phase of a call while sending a default static graphic to a recipient videophone mobile station.

To initiate a video call, the caller presses the softkey 50 which, during audio communication (see FIG. 4), is marked "video". As shown in FIG. 6, the caption "Video Call" is then displayed on the device display title bar. The current audio call is put on hold while a data call is initiated. The video call part of the interface is then launched. At this time the recipient video display area 52 of the callers screen is blank (see FIG. 5). A thumbnail view of the image being seen by the callers videophone camera is displayed on the callers local image screen 51. This allows the caller to preview a live video image of themselves prior to the live video being sent.

Assuming that the recipient has consented to a video call and not rejected the video consent request, a logo 600, or other prestored static or dynamic graphic may be displayed (41 in FIG. 4) on the callers and/or recipients mobile station. This is shown indirectly in FIG. 6 whereby a default still image may be transmitted to the recipients videophone. During this time the caller may still view the equivalent thumbnail image 51 generated by their own videophone. This persists until the recipient party consents to the transmission of live video. The particular default graphic or image sent by the caller may be selected for a plurality of stored files and set by way of a video preferences menu. This default graphic is sent to the recipient videophone and will remain there until the caller consents to live video transmission. During this time, the sending box 53 on the callers videophone displays the text string "Default Still" (see FIG. 6).

From the recipients point of view, when the calling party initiates or requests a video call during an audio call, a dialog box (see FIG. 10) is displayed on the screen of the recipient device. Audible or visual cues such as backlight flashes or a warning tone may also be used to notify a recipient that a caller has requested video. Once the recipient has been notified of the incoming videophone call request, he or she has a number of options. With reference to FIG. 4, the recipient may accept the mutual video call 42, or refuse the connection completely 43 in which case the call is terminated 401. In a preferred embodiment, touching "reject" 94 rejects the video call and returns to the audio call screen. A dialog box will briefly display on the callers videophone indicating that the video request has been refused.

Figure 7:
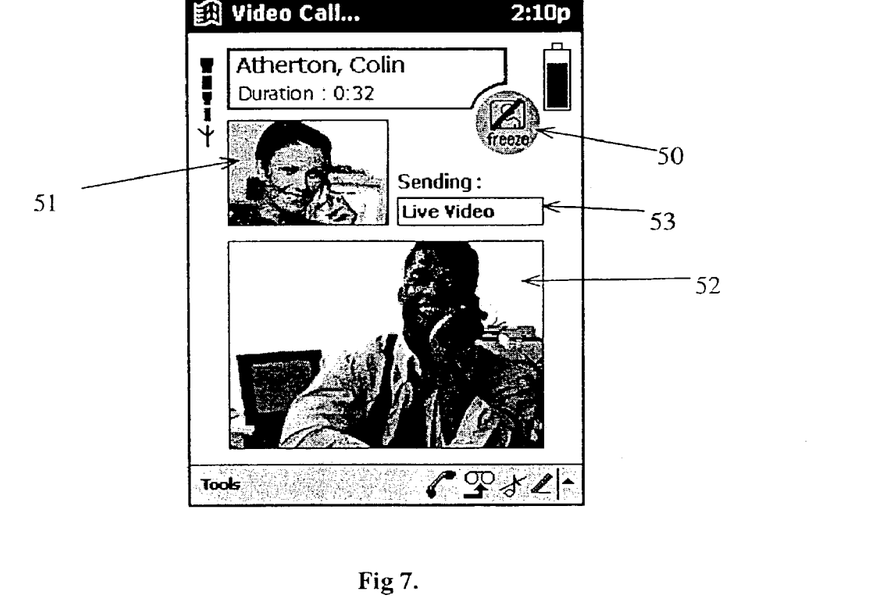
FIG. 7 illustrates a callers videophone display while transmitting and receiving live video to a recipients videophone mobile station.

Assuming that the video call is accepted, for example, by the recipient touching the "Accept" softkey 93, an image generated or triggered by the recipient is displayed on the callers phone. This may be a still picture or logo 600 (see FIG. 6) which the recipient has elected to display until he or she consents to transmit live video. Alternatively, the recipient may immediately accept the video call and start transmitting live video as shown in FIG. 7. In this case, the recipients sending box (not shown) displays-the text string "Live Video" and the callers display shows a live image of the called party 52. During this time it is possible that the image received by the recipient is still a default static image 51 sent by from the caller. Live video from the caller will similarly only be displayed when this is enabled by the calling party. FIG. 7 shows the situation where the caller has allowed live video transmission. At this time, the softkey 50 displays the text "Freeze". Touching the "Freeze" softkey stops video transmission.

The recipient may accept the video call under a number of different circumstances. On consenting to video, a static or dynamic image may be transmitted back to the caller (45 in FIG. 4). Alternatively, a consent message or signal may be transmitted back to the callers mobile station. This might be used to temporarily trigger the display of a locally resident graphic on the callers mobile station while the video call is being set-up.

The options facing both the consenting recipient and caller reflect the varying characteristics of person-to-person communication and possibly the nature of the information which is to be communicated. The examples provided herein are intended to be illustrative and it is possible that other situations may require slightly differing consent/acceptance protocols which are considered within the scope of the invention.

For example, the recipient may elect to switch to video immediately (48 in FIG. 4) with no intermediate delay. Alternatively, the recipient may not wish to transmit a live image of themselves. This may be for a number of reasons including perhaps the recipient not being in a convenient or appropriate situation or perhaps simply not wanting the caller to view them. The transmission of visual information may provide location information or cues which the recipient might wish to remain confidential. In this case, the recipient may alternatively elect to transmit or cause to display on the callers mobile station, a static or dynamic graphic representing perhaps themselves, their service provider or any other graphic which may be selected and transmitted 47. A key element here being that the recipient has indicated a partial willingness to engage in some form of video interaction, but not actual live video exchange. Again, the graphic might possibly be resident on the callers mobile station and be triggered by a messaging signal sent by the recipient. Such an embodiment would be less demanding in terms of bandwidth, and the graphic could be adapted to suit the taste, type of communication as well as possibly linked to the identity of the caller (identified by way of the CLI).

Where a videophone call recipient does not wish to transmit immediate live video to the caller, a delay (46 in FIG. 4) might be introduced in setting up the video link or transmission of live video data. The delay might be preprogrammed or otherwise determined by the user. This functionality is a subset of the call handling which occurs during the live video call. During this delay period, the callers softkey is captioned "Live" and a default image is sent to the recipient. Touching this switches from transmitting the default still image to transmitting live video from the callers phone.

During a video call, the speakerphone is preferably always active and audio is transmitted between the phones from the time that the data call is established.

A further requirement is the ability to review the status of the transmission at any time during the videophone call. This is shown at 49 in FIG. 4 where the recipient or the caller may suspend the video part of the call, revert to voice only, introduce a delay in video transmission, or terminate the call. Such a situation may be linked to another type of data transmission (for example, in the form of a data file or similar) over the communication channel in conjunction with the conversation. In such a case, for bandwidth and speed reasons either user may suspend video transmission and execute data transfer on the low bit-rate communication channel. As shown by the dashed line, once audio/video is initiated, the protocol may be symmetrical in relation to the caller and recipient.

Figure 11:
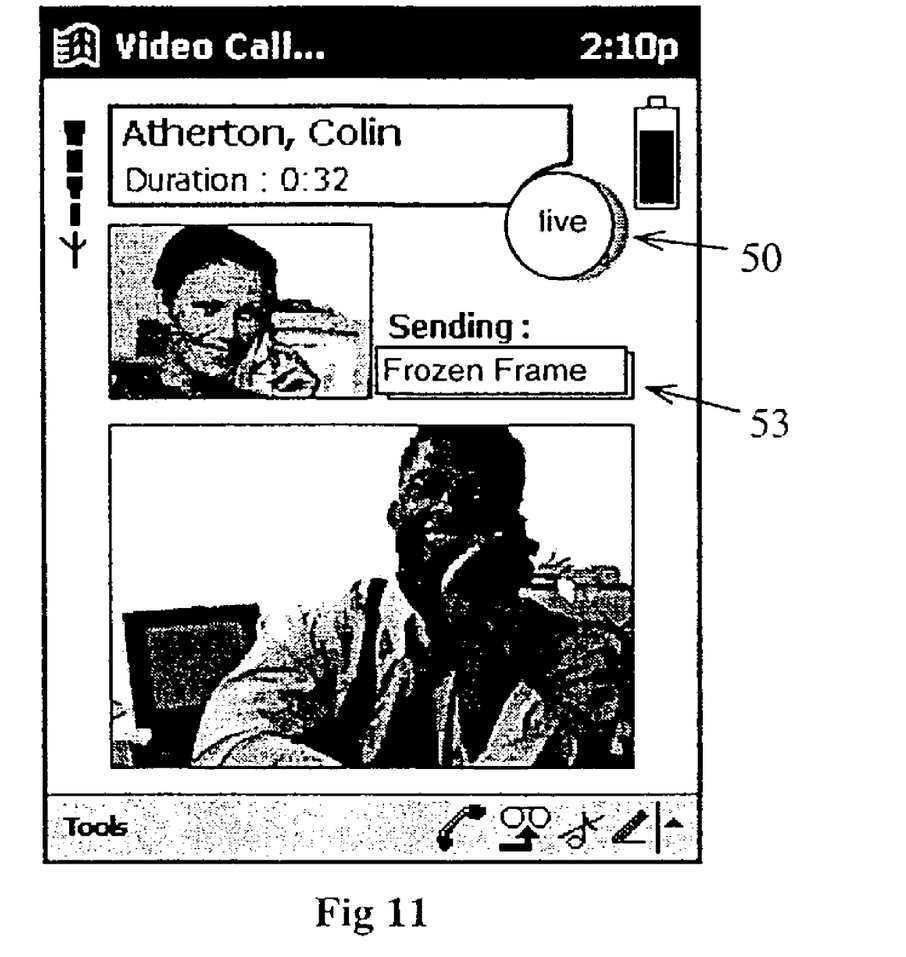
FIG. 11 illustrates a callers videophone display while freezing their live video transmission.

The transmission of live video is indicated by the text "Live Video" in the sending box 53 in FIG. 7. In this context the softkey 50 is captioned "Freeze". Touching this freezes the image currently being transmitted and the display is as shown in FIG. 11. This allows a high-quality still image to be built up on the recipients videophone and also allows the caller to stop sending live video if privacy is desired. Audio is still active while video is frozen, as is the video received from the recipient party by the caller. During a freeze, the text string "Frozen Frame" is displayed in the sending box 53 and the softkey 50 is again captioned "Live". Touching the softkey in this state returns to transmitting live video.

The video call negotiation functionality is symmetrical with respect to the caller and recipient as either party may wish to interrupt live video transmission.

Figure 8:
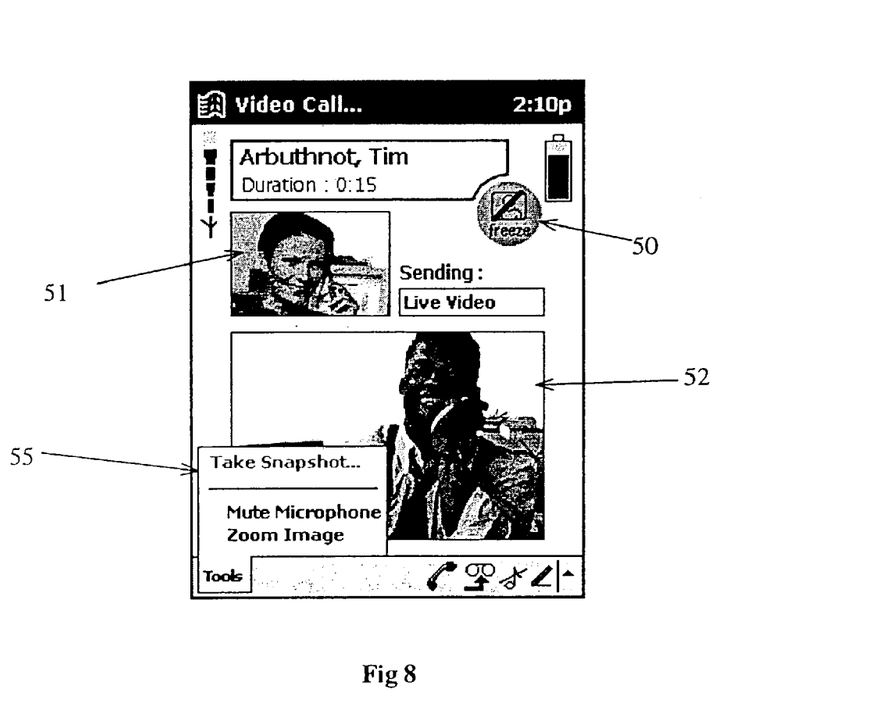
FIG. 8 illustrates a callers videophone display while recording a still image of a recipient during a videophone call.
Figure 9:
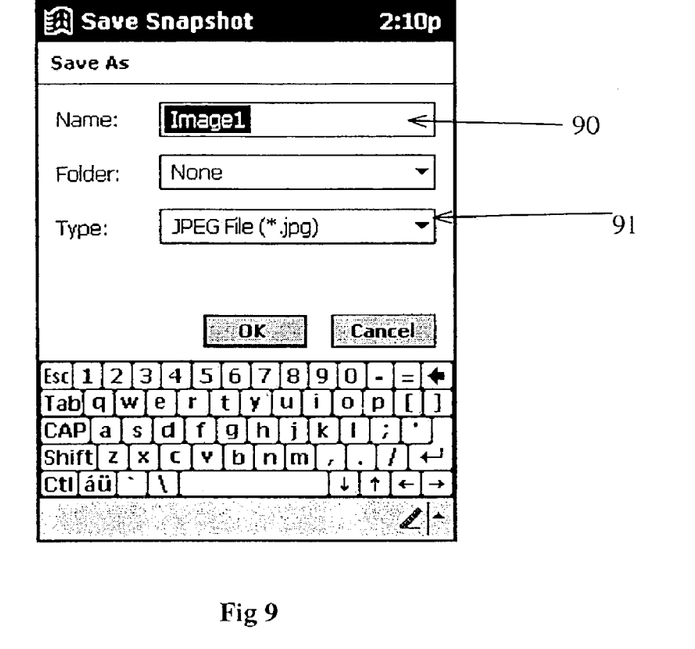
FIG. 9 illustrates a videophone screen interface when saving a captured video image.
Figure 10:
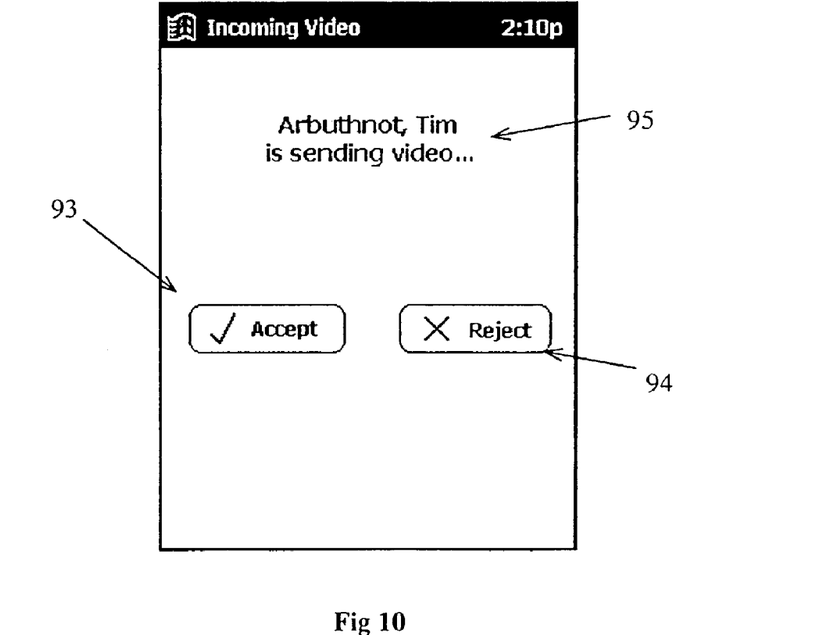
FIG. 10 illustrates an example recipients videophone interface when receiving an incoming videophone call consent request.

The interface and videophone hardware may also include functionality which allows a user to record the incoming video and/or audio. Referring to FIG. 8, this option is available via a dialog box 55 which is triggered by software keys on the display. The 'take snapshot' option is greyed out and unavailable while the video call is connecting. It is ungreyed as soon as an image, whether live, still or frozen, is received from the called party. Selecting this option stores the image currently received from the called party and opens a dialog box (see FIG. 9) allowing the user to enter a filename 90 and file type 91 for the saved image file. Once the file is saved, the "ok" key is touched and the device reverts to displaying the videophone screen. A similar procedure would be followed when recording live video.

There are other situations in which the call consent negotiation procedure may be varied. However, those mentioned above and described with reference to the preferred embodiment, are believed to represent the most common. A key element is the high degree of control that all parties have in negotiating the videophone call.

This embodiment of the invention uses a standard supplementary service (call hold). No changes are required in the operation of these services within the network. However, alternatives include the MSC including functionality to support the switch-mode ability. A further variation could be to always release the first call before setting up the second. Although the present invention is focused primarily on switching from a voice call to voice/video call, the method would be used wherever it is required to change from voice to data.

Although the present invention has been described by way of example only and with reference to the possible embodiments thereof, it to be appreciated that improvements and/or modifications may be made thereto without departing from the scope of the invention as set out in the appended claims.

While the previous description has been given in the context of GSM call handling procedures, with suitable modification, the invention may be implemented in other networks, such as third generation networks.

Where in the foregoing description reference has been made to integers or components having known equivalents, then such equivalents are herein incorporated as if individually set forth.

What is claimed is:

1. A method of setting up a mixed media telecommunications call between mobile stations capable of video telephony, the method comprising:
   connecting a mixed media telecommunications call between a first mobile station capable of video telephony and a second mobile station capable of video telephony;
   receiving data indicative of user selection of a type of video image to be displayed on a display of the second mobile station, wherein the data is received during at least a portion of the connected telecommunications call and via a user interface of the first mobile station, and wherein the user selection is between the following: live video to be captured by a camera of the first mobile station and transmitted to the second mobile station, and pre-stored video; and
   conducting the mixed media telecommunications call, in response to the received data and based at least in part on the user selection, such that the selected type of video image is displayed on the display of the second mobile station during at least a portion of the telecommunications call.

2. The method of claim 1, further comprising displaying a mess on a display of the first mobile station, wherein the message indicates the selected type of video image.

3. The method of claim 1, further comprising displaying one or more video images selected to be displayed on the display of the second mobile station on a display of the first mobile station.

4. The method of claim 1, wherein the pre-stored static or dynamic video comprises one or more video images selected via the user interface of the first mobile station.

5. The method of claim 1, wherein the pre-stored static or dynamic video comprises one or more video images stored at a data store accessible to the first mobile station and transmitted to the second mobile station for display.

6. The method of claim 1, wherein the pre-stored static or dynamic video comprises one or more video images stored at a data store accessible to the second mobile station and displayed in response to a message sent from the first mobile station to the second mobile station.

7. The method of claim 1, wherein a live video image displayed on the display of the second mobile station is frozen when the user input indicates live video as the selected type of video image to be displayed and in response to subsequent user input via the user interface of the first mobile station.

8. The method of claim 1, wherein the user selection is further between pre-stored static video and pre-stored dynamic video.

9. A method of transferring communications between communication channels having differing bandwidths, the method comprising:
   establishing data communications on a first channel having a first bandwidths, wherein data communications on the first channel comprise audio calls;
   establishing data communications on a second channel in response to a trigger indicating changes in the data to be communicated, wherein the second channel has a second bandwidth which provides use of resources, and wherein data communications on the second channel comprise combined audio and video calls;
   placing the audio call on hold during set up of the combined audio and video call; and releasing communications on the first channel in response to set up of data communications on the second channel.

10. The method of claim 9, wherein the first channel is configured to transmit encoded audio data, and the second channel is configured to transmit combined encoded audio and video data.

11. The method of claim 9, further comprising switching back to communications on the first channel at the instigation of a user of the communications link.

12. The method of claim 9, wherein a user of the communications link has the capability to transfer communications between the first and second communication channels.

13. The method of claim 9, comprising the use of a call hold supplementary service.

14. The method of claim 9, wherein the second channel is used to transmit one or more of the following between a first user and a second user: live video, pre-recorded still images, pre-recorded dynamic video, and combined audio and video.

15. The method of claim 14, wherein at least one of the first user and the second user has the option to revert to the first channel during the mixed media call.

16. The method of claim 9, wherein the first channel data communications comprises a signaling message which notifies a recipient that the caller wishes to initiate the mixed media call.

17. The method of claim 16, wherein the signaling message comprises one of a SMS message, a signaling message, and an administration message.

18. The method of claim 17, wherein the signaling message contains caller identification data and information which is interpreted by a recipient's mobile station to allow the recipient to switch to at least one of a selected video and audio mode.

19. A videophone call set up interface protocol comprising:
transmitting, via a caller mobile station, a request-consent-to-video message from a caller to a recipient; and
transmitting, via a recipient mobile station, a consent message from the recipient, wherein transmitting the consent message triggers the establishment of a combined voice and video call and the placement on hold of a voice call in progress between the caller and the recipient.

20. The videophone call set up interface protocol of claim 19, wherein a variable delay is introduced prior to establishment of the combined voice and video call.

21. The videophone call set up interface protocol of claim 19, wherein the call either defaults to a voice call or the call is abandoned in response to the second user withholding the consent message.

22. The videophone call set up interface protocol of claim 19, further comprising displaying at least one of live or pre-recorded static or dynamic video on at least one of the caller mobile station and the recipient mobile station.

23. The videophone call set up interface protocol of claim 22, further comprising transmitting a static image stored on the recipient mobile station to the caller in response to transmitting the consent message.

24. The videophone call set up interface protocol of claim 22, wherein the static image comprises an image of a person sending the image.

25. The videophone call set up interface protocol of claim 19, further comprising transmitting live video to at least one of the caller and recipient.

26. A videophone configured to operate according to a method comprising:
receiving data indicative of user selection, during at least a portion of a telecommunications call between a first mobile station and a second mobile station and via a user interface of the first mobile station, wherein the user selection is of a type of video image to be displayed on display of a the second mobile station, wherein the selection is between at least the following: live video to be captured by a camera of the first mobile station and transmitted to the second mobile station, pre-stored video; and
conducting the mixed media telecommunications call based on the user input, such that the selected type of video image is displayed on the display of the second mobile station during at least a portion of the telecommunications call.

27. The videophone of claim 26, wherein the user selection is further between pre-stored static video and pre-stored dynamic video.

28. A computer readable medium having a program for executing a method of setting up a mixed media telecommunications call between mobile stations capable of video telephony, the method comprising:
receiving data indicative of user selection, during at least a portion of a telecommunications call between a first mobile station and a second mobile station and via a user interface of the first mobile station, wherein the user selection is of a type of video image to be displayed on a display of the second mobile stations, wherein the selection is between at least the following: live video to be captured by a camera of the first mobile station and transmitted to the second mobile station, pre-stored video; and
conducting the mixed media telecommunications call based on the user input, such that the selected type of video image is displayed on the display of the second mobile station during at least a portion of the telecommunications call.

29. The computer readable medium of claim 28, wherein the user selection is further between pre-stored static video and pre-stored dynamic video.

30. A computer readable medium having a program for executing a method of transferring communications between communication channels having differing bandwidths, the method comprising:
establishing data communications on a first channel having a first bandwidth;
establishing data communications on a second channel in response to a trigger indicating changes in the data to be communicated, wherein the second channel has a second bandwidth which provides use of resources;
pausing data communications on the first channel during the establishment of second data channel communications; and
releasing communications on the first channel in response to set up of data communications on the second channel.

31. A method of setting up a mixed media telecommunications call between mobile stations capable of video telephony, the method comprising:
connecting a mixed media telecommunications call between a first mobile station capable of video telephony and a second mobile station capable of video telephony;
receiving data indicative of user selection of a type of video image to be displayed on a display of the second mobile station, wherein the data is received during at least a portion of the connected telecommunications call and via a user interface of the first mobile station, and wherein the user selection is between the following: live video to be captured by a camera of the first mobile station and transmitted to the second mobile station, and pre-stored static images; and conducting the mixed media telecommunications call, in response to the received data and based at least in part on the user selection, such that the selected type of video image is displayed on the display of the second mobile station during at least a portion of the telecommunications call.

* * * * *